United States Patent
Luft et al.

(10) Patent No.: US 7,706,291 B2
(45) Date of Patent: Apr. 27, 2010

(54) MONITORING QUALITY OF EXPERIENCE ON A PER SUBSCRIBER, PER SESSION BASIS

(75) Inventors: Siegfried J. Luft, Vancouver (CA); Jonathan Back, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 314 days.

(21) Appl. No.: 11/890,073

(22) Filed: Aug. 1, 2007

(65) Prior Publication Data

US 2009/0034426 A1 Feb. 5, 2009

(51) Int. Cl.
*H04J 1/16* (2006.01)
(52) U.S. Cl. .................. 370/246; 370/226; 370/229; 370/401
(58) Field of Classification Search ......... 370/229–236, 370/400–402, 246; 709/223–226
See application file for complete search history.

(56) References Cited

U.S. PATENT DOCUMENTS

| | | | |
|---|---|---|---|
| 4,720,850 A | 1/1988 | Oberlander et al. |
| 4,893,302 A | 1/1990 | Hemmady et al. |
| 5,428,781 A | 6/1995 | Duault et al. |
| 6,111,852 A | 8/2000 | Leung et al. |
| 6,148,410 A | 11/2000 | Baskey et al. |
| 6,262,974 B1 | 7/2001 | Chevalier et al. |
| 6,320,863 B1 | 11/2001 | Ramfelt |
| 6,587,470 B1 | 7/2003 | Elliot et al. |
| 6,608,832 B2 | 8/2003 | Forslow |
| 6,618,355 B1 | 9/2003 | Gulliford et al. |
| 6,678,281 B1 | 1/2004 | Chakrabarti et al. |
| 6,694,450 B1 | 2/2004 | Kidder et al. |
| 6,741,595 B2 | 5/2004 | Maher et al. |
| 6,751,191 B1 | 6/2004 | Kanekar et al. |
| 6,779,030 B1 | 8/2004 | Dugan et al. |
| 6,789,116 B1 | 9/2004 | Sarkissian et al. |

(Continued)

FOREIGN PATENT DOCUMENTS

CA    1 295 391    2/1992

(Continued)

OTHER PUBLICATIONS

PCT/CA2008/001357, PCT International Search Report and Written Opinion of the International Searching Authority, mailed Nov. 6, 2008, 10 pages.

(Continued)

*Primary Examiner*—Ricky Ngo
*Assistant Examiner*—Gary Mui
(74) *Attorney, Agent, or Firm*—Blakely Sokoloff Taylor & Zafman LLP

(57) ABSTRACT

A system and method for monitoring quality of experience includes forwarding a data packet flow carrying content between first and second endpoints. The data packet flow is forwarded at an intermediate point between the first and second endpoints so that the first and second endpoints are communicatively coupled over one or more networks through the intermediate point. The data packet flow is analyzed at the intermediate point and an intermediate point quality of content rating of the content received at the intermediate point is generated. A report detailing one or more attributes about the data packet flow based at least in part on the intermediate point quality of content rating is further generated.

27 Claims, 10 Drawing Sheets

U.S. PATENT DOCUMENTS

| | | | |
|---|---|---|---|
| 6,847,613 B2 | 1/2005 | Mimura et al. | |
| 6,873,600 B1 | 3/2005 | Duffield et al. | |
| 6,944,673 B2 | 9/2005 | Malan et al. | |
| 6,948,003 B1 | 9/2005 | Newman et al. | |
| 6,961,539 B2 | 11/2005 | Schweinhart et al. | |
| 6,968,394 B1 | 11/2005 | El-Rafie | |
| 6,985,431 B1 | 1/2006 | Bass et al. | |
| 7,002,977 B1 | 2/2006 | Jogalekar | |
| 7,085,230 B2 | 8/2006 | Hardy | |
| 7,120,931 B1 | 10/2006 | Cheriton | |
| 7,143,006 B2 | 11/2006 | Ma et al. | |
| 7,257,616 B2 | 8/2007 | Bass et al. | |
| 7,272,115 B2 | 9/2007 | Maher, III et al. | |
| 7,289,433 B1 | 10/2007 | Chmara et al. | |
| 7,376,731 B2 | 5/2008 | Khan et al. | |
| 7,420,917 B2 | 9/2008 | Ishikawa et al. | |
| 7,492,713 B1 | 2/2009 | Turner et al. | |
| 7,496,661 B1 | 2/2009 | Morford et al. | |
| 2002/0016860 A1 | 2/2002 | Garcia-Luna-Aceves et al. | |
| 2002/0036983 A1 | 3/2002 | Widegren et al. | |
| 2002/0107908 A1 | 8/2002 | Dharanikota | |
| 2002/0116521 A1 | 8/2002 | Paul et al. | |
| 2002/0122424 A1 | 9/2002 | Kawarai et al. | |
| 2002/0181462 A1 | 12/2002 | Surdila et al. | |
| 2003/0067903 A1 | 4/2003 | Jorgensen | |
| 2003/0081546 A1 | 5/2003 | Agrawal et al. | |
| 2003/0108015 A1 | 6/2003 | Li | |
| 2003/0118029 A1 | 6/2003 | Maher et al. | |
| 2004/0013089 A1 | 1/2004 | Taneja et al. | |
| 2004/0028051 A1 | 2/2004 | Etemadi et al. | |
| 2004/0071084 A1* | 4/2004 | El-Hennawey et al. | 370/230 |
| 2004/0111461 A1 | 6/2004 | Claudatos et al. | |
| 2004/0248583 A1 | 12/2004 | Satt et al. | |
| 2005/0041584 A1 | 2/2005 | Lau et al. | |
| 2005/0068722 A1 | 3/2005 | Wei | |
| 2005/0089043 A1* | 4/2005 | Seckin et al. | 370/395.21 |
| 2005/0141493 A1 | 6/2005 | Hardy et al. | |
| 2005/0213504 A1 | 9/2005 | Enomoto et al. | |
| 2005/0254502 A1 | 11/2005 | Choi | |
| 2006/0015698 A1 | 1/2006 | Kim et al. | |
| 2006/0028982 A1 | 2/2006 | Wright | |
| 2006/0028983 A1 | 2/2006 | Wright | |
| 2006/0072451 A1 | 4/2006 | Ross | |
| 2006/0101159 A1 | 5/2006 | Yeh et al. | |
| 2006/0114832 A1 | 6/2006 | Hamilton et al. | |
| 2006/0140119 A1 | 6/2006 | Yeh et al. | |
| 2006/0140128 A1 | 6/2006 | Chi et al. | |
| 2006/0149841 A1 | 7/2006 | Strub | |
| 2006/0153174 A1 | 7/2006 | Towns-von Stauber et al. | |
| 2006/0233100 A1 | 10/2006 | Luft et al. | |
| 2006/0233101 A1 | 10/2006 | Luft et al. | |
| 2007/0058629 A1 | 3/2007 | Luft | |
| 2007/0058632 A1 | 3/2007 | Back et al. | |
| 2007/0061433 A1 | 3/2007 | Reynolds et al. | |
| 2007/0127473 A1* | 6/2007 | Kessler et al. | 370/390 |
| 2007/0140131 A1* | 6/2007 | Malloy et al. | 370/241 |
| 2007/0233698 A1 | 10/2007 | Sundar et al. | |
| 2007/0234364 A1 | 10/2007 | Lipton et al. | |
| 2007/0286351 A1* | 12/2007 | Ethier et al. | 379/32.01 |
| 2008/0082979 A1 | 4/2008 | Coppinger et al. | |
| 2008/0104009 A1 | 5/2008 | Back et al. | |
| 2008/0104085 A1 | 5/2008 | Papoutsakis et al. | |
| 2008/0155087 A1 | 6/2008 | Blouin et al. | |
| 2008/0177424 A1 | 7/2008 | Wheeler | |
| 2008/0291923 A1 | 11/2008 | Back et al. | |
| 2008/0298230 A1 | 12/2008 | Luft et al. | |

FOREIGN PATENT DOCUMENTS

| | | |
|---|---|---|
| CA | 2 276 526 A1 | 7/1998 |
| CA | 2 511 997 A1 | 8/2004 |
| WO | WO 99/30460 | 6/1999 |
| WO | WO 00/33511 A1 | 6/2000 |
| WO | WO 02/15521 A1 | 2/2002 |
| WO | WO 02/21276 A1 | 3/2002 |
| WO | WO 03/094449 A1 | 11/2003 |
| WO | WO 03/103239 A1 | 12/2003 |
| WO | WO2005/017707 A2 | 2/2005 |
| WO | WO 2005/022852 A1 | 2/2005 |
| WO | WO/2005/088929 | 9/2005 |
| WO | WO 2006/020834 A1 | 2/2006 |
| WO | WO 2007/030916 A1 | 3/2007 |
| WO | WO 2007/030917 A1 | 3/2007 |

OTHER PUBLICATIONS

Gupta P. et al., "Packet Classification using Hierarchical Intelligent Cuttings", ComputerSystems Laboratory, Stanford University; 1999. (Retrieved from the internet: http://tinytera.stanford.edu/~nickm/papers/HOTI_99.pdf).

Zapater, et al., "A Proposed Approach for Quality of Experience Assurance of IPTV", Proccedings of the First International Conference on the Digital Society (ICDS'07), pp. 25-30, Jan. 2007, IEEE.

CISCO Systems, "NetFlow Services Solutions Guide", Last updated Jan. 22, 2007, pp. 1-72, http://www.cisco.com/en/US/docs/ios/solutions_docs/netflow/nfwhite.pdf.

CISCO Systems, "NetFlow Ecosystems Solutions, white paper", Feb. 5, 2007, pp. 1-29, http://www.cisco.com/warp/public/732/Tech/nmp/netflow/docs/netflow_eco_WP.pdf.

Chakchai, So-In, "A Survey of Network Traffic Monitoring and Analysis Tools", Washington University in St. Louis, Fall 2006, pp. 1-27, http://www.rajjain.com/cse567-06/ftp/net_traffic_monitors3/index.html.

Bodin, U., et al., "End-to-End QoS control architectures from a wholesale and retail perspective: benefits and challenges." [retrieved Apr. 19, 2007]. Retrieved from the Internet: www.operax.com. Operax, Tegeluddsvägen 92, SE-115 28, Stockholm, Sweden.

Gallon, C., et al., MSF Technical Report, MSF-TR-ARCH-005-FINAL. "Bandwidth Management in Next Generation Packet Networks." MultiService Forum. Aug. 2005. [retrieved Apr. 19, 2007]. Retrieved from the Internet: <URL: http://www.msforum.org/techinfo/reports/MSF-TR-ARCH-005-FINAL.pdf>.

Jungck, Peder, "Open Network Services Platforms for High-Value Network Services", [online], 2004 [retrieved Feb. 28, 2007]. Retrived from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." [retrieved Feb. 28, 2007]. Retrieved from the Internet: www.operax.com. Operax, Tegeluddsvägen 92, SE-115 28, Stockholm, Sweden. Sep. 2005.

"CloudShield Content Control Suite: Modular Software for Implementing Multi-Function Service Control." [retrieved Feb. 28, 2007]. Retrieved from the Internet: CloudShield Technologies, Inc., www.cloudshield.com. CloudShield, 212 Gibraltar Drive, Sunnyvale, California 94089. 2006.

"CloudShield Network Observatory: CS-2000 with $3^{rd}$ Party Applications Bring Network Content Into Focus." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CloudShield PacketWorks IDE: Developers' Toolkit for CS-2000 In-Network Computing Platform." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CS-2000 Content Processing Platform: Multi-Function Systems for Controlling and Securing Next Generation Services." [retrieved Feb. 28, 2007]. Retrieved from the Internet: CloudShield Technologies, Inc., www.cloudshield.com. CloudShield, 212 Gibraltar Drive, Sunnyvale, California 94089. 2006.

"Delivering Video over IP," Microsoft Corporation, 2003.

"Efficient Network Resource Control—A Source of Competitive Advantage." [retrieved Apr. 19, 2007]. Retrieved from the Internet: www.operax.com. Operax, Tegeluddsvägen 92, SE-115 28, Stockholm, Sweden. Sep. 2005.

"Ellacoya Introduces VoIP Quality Reporter (VQR)." [online] Ellacoya Networks, Inc., [retrieved Apr. 19, 2007] Retrieved from the Internet: <URL: http://www.ellacoya.com/products/vqr.shtml>.

"Ellacoya Multimedia Service Manager (MSM) PacketCable Multi-media-based Application." [online] Ellacoya Networks, Inc., [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., [retrieved Apr. 19, 2007] Retrieved from the Internet: <URL: http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"How IPv4 Multicasting Works," Microsoft TechNet, Microsoft Corporation, Mar. 28, 2003, pp. 1-32.

"How Unicast Ipv4 Routing Protocols and Services Work," Microsoft TechNet, Microsoft Corporation, Mar. 28, 2003, pp. 1-60.

"IMS and Operax Bandwidth Manager—Guaranteed QoS." [retrieved Apr. 19, 2007]. Retrieved from the Internet: www.operax.com. Operax, Tegeluddsvägen 92, SE-115 28, Stockholm, Sweden. 2006.

"Integrating Applications with the CloudShield ONSP." [retrieved Feb. 28, 2007]. Retrived from the Internet: CloudShield Technologies, Inc., www.cloudshield.com. CloudShield, 212 Gibraltar Drive, Sunnyvale, California 94089. Aug. 2004.

"Integrated Content Control for an All IP World." [retrieved Feb. 28, 2007]. Retrieved from the Internet: CloudShield Technologies, Inc., www.cloudshield.com. CloudShield, 212 Gibraltar Drive, Sunnyvale, California 94089.

"IP Service Control System." [retrieved Apr. 19, 2007] Retrieved from the Internet: Ellacoya Networks, Inc., www.ellacoya.com. Ellacoya Networks, 7 Henry Clay Drive, Merrimack, NH 03054 USA. 2005.

"Managed DDoS Security Services: An Arbor Networks/CloudShield Solution." [retrived Feb. 28, 2007]. Retrieved from the Internet: CloudShield Technologies, Inc., www.cloudshield.com. CloudShield, 212 Gibraltar Drive, Sunnyvale, California 94089. Aug. 2004.

"Meeting the Multi-Service IP QoS Challenges." [retrieved Apr. 19, 2007]. Retrieved from the Internet: www.operax.com. Operax, Tegeluddsvägen 92, SE-115 28, Stockholm, Sweden.

"On the Road to IP Multi-Service." [retrieved Apr. 19, 2007]. Retrieved from the Internet: www.operax.com. Operax, Tegeluddsvägen 92, SE-115 28, Stockholm, Sweden.

"Operax Bandwidth Manager 5500: QoS control for the access, aggregation and edge." [retrieved Apr. 19, 2007]. Retrieved from the Internet: www.operax.com. Operax, Tegeluddsvägen 92, SE-115 28, Stockholm, Sweden. 2006.

"Operax Bandwidth Manager 5700: QoS control for IP/MPLS Networks." [retrieved Apr. 19, 2007]. Retrieved from the Internet: www.operax.com. Operax, Tegeluddsvägen 92, SE-115 28, Stockholm, Sweden. 2006.

"Operax guarantees QoS for Video Telephony: QoS guaranteed value added services." [retrieved Apr. 19, 2007]. Retrieved from the Internet: www.operax.com. Operax, Tegeluddsvägen 92, SE-115 28, Stockholm, Sweden. 2005.

"Operax in IP Multimedia Subsystem (IMS): Advanced QoS control for IMS/NGN." [retrieved Apr. 19, 2007]. Retrieved from the Internet: www.operax.com. Operax, Tegeluddsvägen 92, SE-115 28, Stockholm, Sweden. 2006.

"Operax Triple Play: Service Control System." [retrieved Apr. 19, 2007]. Retrieved from the Internet: www.operax.com. Operax, Tegeluddsvägen 92, SE-115 28, Stockholm, Sweden. 2005.

"Prolexic DNS Shield on CS-2000: Prolexic and CloudShield Integrated Solution for DNS Service Protection." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"A Unified Policy Management Framework: IP Service Creation and Assurance in Convergence Networks." [retrieved Apr. 19, 2007]. Retrieved from the Internet: www.operax.com. Operax, Tegeluddsvägen 92, SE-115 28, Stockholm, Sweden. Nov. 2006.

"What is Unicast IPv4 Routing?" Microsoft TechNet, Microsoft Corporation, March 28, 2003, pp. 1-6.

PCT/CA2006/000555, PCT International Search Report and Written Opinion, Jul. 26, 2006.

PCT/CA2006/000554, PCT International Search Report and Written Opinion, Aug. 1, 2006.

PCT/CA2006/001414, PCT International Search Report and Written Opinion, Dec. 19, 2006.

PCT/CA2006/001423, PCT International Search Report and Written Opinion, Dec. 18, 2006.

PCT/CA/2006/001469, PCT International Search Report and Written Opinion, Dec. 28, 2006.

"Subjective Video Quality", Retrieved from the Internet (Mar. 29, 2007); Wikipedia, the free encyclopedia, http://en.wikipedia.org/wiki/subjective_video_quality.

"Mean Opinion Score", Retrieved from the Internet (Mar. 29, 2007); Wikipedia, the free encyclopedia, http://en.wikipedia.org/wiki/Mean_Opinion_Score.

Clark, Alan, "RTCP XR Measures VoIP Performance", Retrieved from the Internet (Mar. 30, 2007); Networkworld, http://www.NetworkWorld.com/news/tech/2003/1117techupdate.html.

"Real Time Control Protocol", Retrieved from the Internet (Mar. 30, 2007); Wikipedia, the free encyclopedia, http://en.wikipedia.org/wiki/RTCP.

"Simple Mail Transfer Protocol", Retrieved from the Internet (Mar. 30, 2007); Wikipedia, the free encyclopedia, http//en.wikipedia.org/wiki/Smtp.

"Simple Network Management Protocol", Retrieved from the Internet (Apr. 9, 2007); Wikipedia, the free encyclopedia, http//en.wikipedia.org/wiki/SNMP.

* cited by examiner

SESSION REPORT FOR VOIP CALL

1000

SUBSCRIBER ID: JENNY DOE
SESSION ID: 123456789
PROTOCOL: VOIP

CALL DURATION: 1:04:23
START TIME: 7:03 PM
END TIME: 8:07 PM

CALL FROM: (604) 236-9876
CALL TO: (425) 867-5309

SOURCE MOS (AVG): 3.5
SOURCE MOS (LOW): 3.1
SOURCE MOS (HIGH): 3.9

DESTINATION MOS (AVG): 3.2
DESTINATION MOS (HIGH): 3.7
DESTINATION MOS (LOW): 3.0

INBOUND STREAM:
INTERMEDIATE POINT MOS (AVG): 3.7
INTERMEDIATE MOS (HIGH): 3.3
INTERMEDIATE MOS (LOW): 3.8

OUTBOUND STREAM:
INTERMEDIATE POINT MOS (AVG): 3.7
INTERMEDIATE MOS (HIGH): 3.3
INTERMEDIATE MOS (LOW): 3.8

FIG. 10

MONITORING QUALITY OF EXPERIENCE ON A PER SUBSCRIBER, PER SESSION BASIS

TECHNICAL FIELD

This disclosure relates generally to packet based networking, and in particular but not exclusively, relates to tracking quality of service and monitoring quality of experience in a packet based network.

BACKGROUND INFORMATION

The Internet is becoming a fundamental tool used in our personal and professional lives on a daily basis. As such, the bandwidth demands placed on network elements that underpin the Internet are rapidly increasing. In order to feed the seemingly insatiable hunger for bandwidth, parallel processing techniques have been developed to scale compute power in a cost effective manner.

As our reliance on the Internet deepens, industry innovators are continually developing new and diverse applications for providing a variety of services to subscribers. However, supporting a large diversity of services and applications using parallel processing techniques within a distributed compute environment introduces a number of complexities. One such complexity is to ensure that all available compute resources in the distributed environment are efficiently shared and effectively deployed. Ensuring efficient sharing of distributed resources requires scheduling workloads amongst the distributed resources in an intelligent manner so as to avoid situations where some resources are overburdened, while others lay idle. Another such complexity is how to support new and unexpected behavior demanded by the growing diversity of services within the infrastructure of a distributed environment that has already been deployed in the field.

FIG. 1 illustrates a modern metro area network 100 for providing network services to end users or subscribers. Metro area network 100 is composed of two types of networks: a core network 102 and one of more access networks 106. Core network 102 communicates data traffic from one or more service providers 104A-104N in order to provide services to one or more subscribers 108A-108M. Services supported by the core network 102 include, but are not limited to, (1) a branded service, such as a Voice over Internet Protocol (VoIP), from a branded service provider; (2) a licensed service, such as Video on Demand (VoD) or Internet Protocol Television (IPTV), through a licensed service provider and (3) traditional Internet access through an Internet Service Provider (ISP).

Core network 102 may support a variety of protocols (Synchronous Optical Networking (SONET), Internet Protocol (IP), Packet over SONET (POS), Dense Wave Division Multiplexing (DWDM), Border Gateway Protocol (BGP), etc.) using various types of equipment (core routers, SONET add-drop multiplexers, DWDM equipment, etc.). Furthermore, core network 102 communicates data traffic from the service providers 104A-104N to access network(s) 106 across link(s) 112. In general, link(s) 112 may be a single optical, copper or wireless link or may comprise several such optical, copper or wireless link(s).

On the other hand, the access network(s) 106 complements core network 102 by aggregating the data traffic from the subscribers 108A-108M. Access network(s) 106 may support data traffic to and from a variety of types of subscribers 108A-108M, (e.g. residential, corporate, mobile, wireless, etc.). Although access network(s) 106 may not comprise of each of the types of subscriber (residential, corporate, mobile, etc), access(s) network 106 will comprise at least one subscriber. Typically, access network(s) 106 supports thousands of subscribers 108A-108M. Access networks 106 may support a variety of protocols (e.g., IP, Asynchronous Transfer Mode (ATM), Frame Relay, Ethernet, Digital Subscriber Line (DSL), Point-to-Point Protocol (PPP), PPP over Ethernet (PPPoE), etc.) using various types of equipment (Edge routers, Broadband Remote Access Servers (BRAS), Digital Subscriber Line Access Multiplexers (DSLAM), Switches, etc). Access network(s) 106 uses a subscriber policy manager (s) 110 to set policies for individual ones and/or groups of subscribers. Policies stored in a subscriber policy manager(s) 110 allow subscribers access to different ones of the service providers 104A-N. Examples of subscriber policies are bandwidth limitations, traffic flow characteristics, amount of data, allowable services, etc.

Subscriber traffic flows across access network(s) 106 and core network 102 in data packets. A data packet (also known as a "packet") is a block of user data with necessary address and administration information attached, usually in a packet header and/or footer, which allows the data network to deliver the data packet to the correct destination. Examples of data packets include, but are not limited to, IP packets, ATM cells, Ethernet frames, SONET frames and Frame Relay packets. Typically, data packets having similar characteristics (e.g., common source and destination) are referred to as a flow.

FIG. 2 represents the Open Systems Interconnect (OSI) model of a layered protocol stack 200 for transmitting data packets. Each layer installs its own header in the data packet being transmitted to control the packet through the network. The physical layer (layer 1) 202 is used for the physical signaling. The next layer, data link layer (layer 2) 204, enables transferring of data between network entities. The network layer (layer 3) 206 contains information for transferring variable length data packet between one or more networks. For example, IP addresses are contained in the network layer 206, which allows network devices (also commonly referred to a network elements) to route the data packet. Layer 4, the transport layer 208, provides transparent data transfer between end users. The session layer (layer 5) 210, provides the mechanism for managing the dialogue between end-user applications. The presentation layer (layer 6) 212 provides independence from difference in data representation (e.g. encryption, data encoding, etc.). The final layer is the application layer (layer 7) 212, which contains the actual data used by the application sending or receiving the packet. While most protocol stacks do not exactly follow the OSI model, it is commonly used to describe networks.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 10 is an example session report for a voice over internet protocol call, in accordance with an embodiment of the invention.

DETAILED DESCRIPTION

Embodiments of a system and method for monitoring subscriber quality of experience at an intermediate point between the subscriber of a service and the provider of the service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "flow" or "packet flow" is defined herein as a sequence of related packets having common characteristics. For example, a sequence of packets moving through a network node having a common N-tuple signature may be defined as a single flow. In one embodiment, the N-tuple signature is a 6-tuple signature including the following packet fields: destination address, source address, destination port, source port, protocol, and differentiated service code point. A "classification rule" is defined herein as the combination of classification criteria with an associated action or actions to be performed on the classified packet flow. The classification criteria may be an exact match N-tuple signature or various wildcard signatures (e.g., range match, prefix match, non-contiguous bit masking match, ternary "don't care" match, etc.). The action or actions may be a forwarding action, an interception action, a bifurcation (e.g., replication) action, a termination action, some combination thereof, or various other processing actions.

Figure 1:
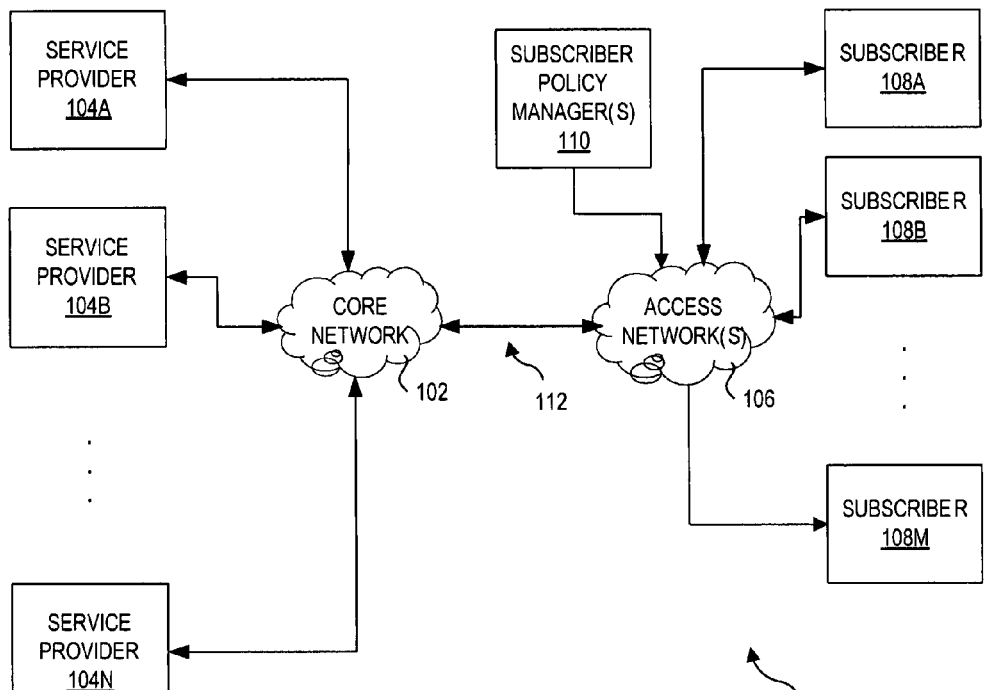
FIG. 1 (Prior Art) illustrates a typical metro area network configuration.
Figure 2:
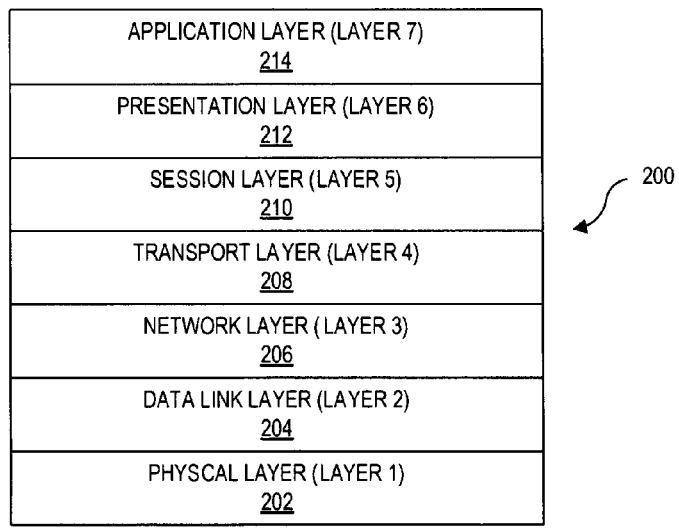
FIG. 2 (Prior Art) is a block diagram illustrating layers of the Open Systems Interconnect protocol stack.
Figure 3:
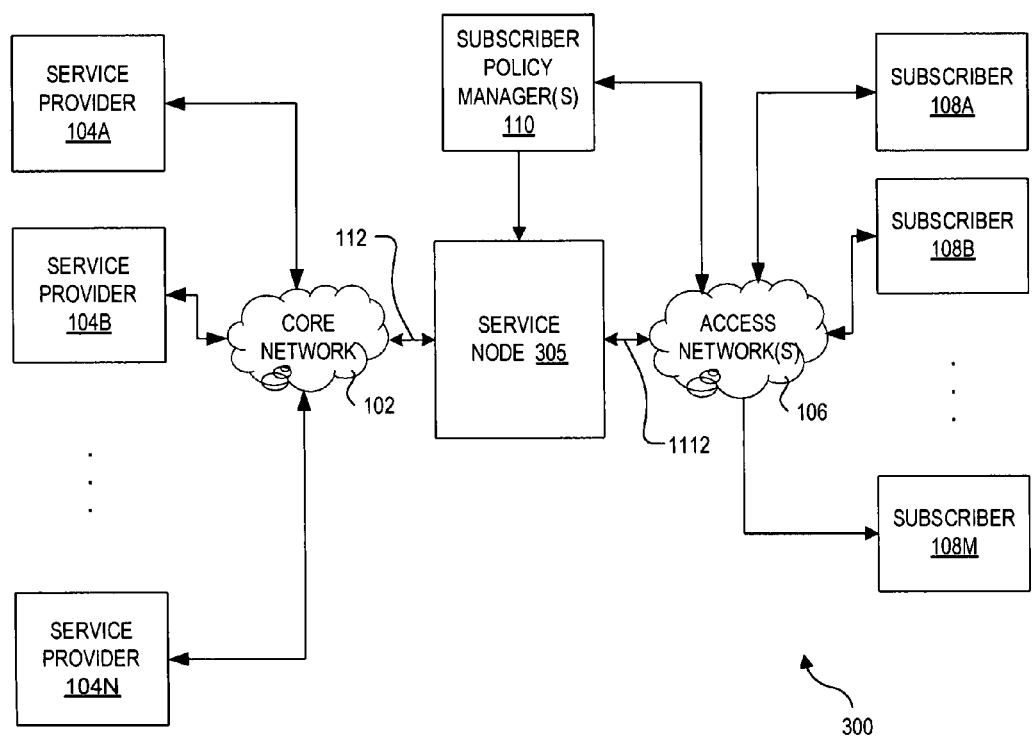
FIG. 3 is a block diagram illustrating a demonstrative metro area network configuration including a network service node to provide application and subscriber aware packet processing, in accordance with an embodiment of the invention

FIG. 3 is a block diagram illustrating a demonstrative metro area network 300 including a network service node 305 to provide application and subscriber aware packet processing, in accordance with an embodiment of the invention. Metro area network 300 is similar to metro area network 100 with the exception of network service node 305 inserted at the junction between access network 106 and core network 102.

In one embodiment, network service node 305 is an application and subscriber aware network element capable of implementing application specific policies on a per subscriber basis at line rates. For example, network service node 305 can perform quality of service ("QoS") tasks (e.g., traffic shaping, flow control, admission control, etc.) on a per subscriber, per application basis, while monitoring quality of experience ("QoE") on a per session basis. To enable QoS and QoE applications for a variety of network services (e.g., VoD, VoIP, IPTV, etc.), network service node 305 is capable of deep packet inspection all the way to the session and application layers of the OSI model. To provide this granularity of service to hundreds or thousands of unique subscribers requires leveraging parallel processing advantages of a distributed compute environment.

Figure 4:
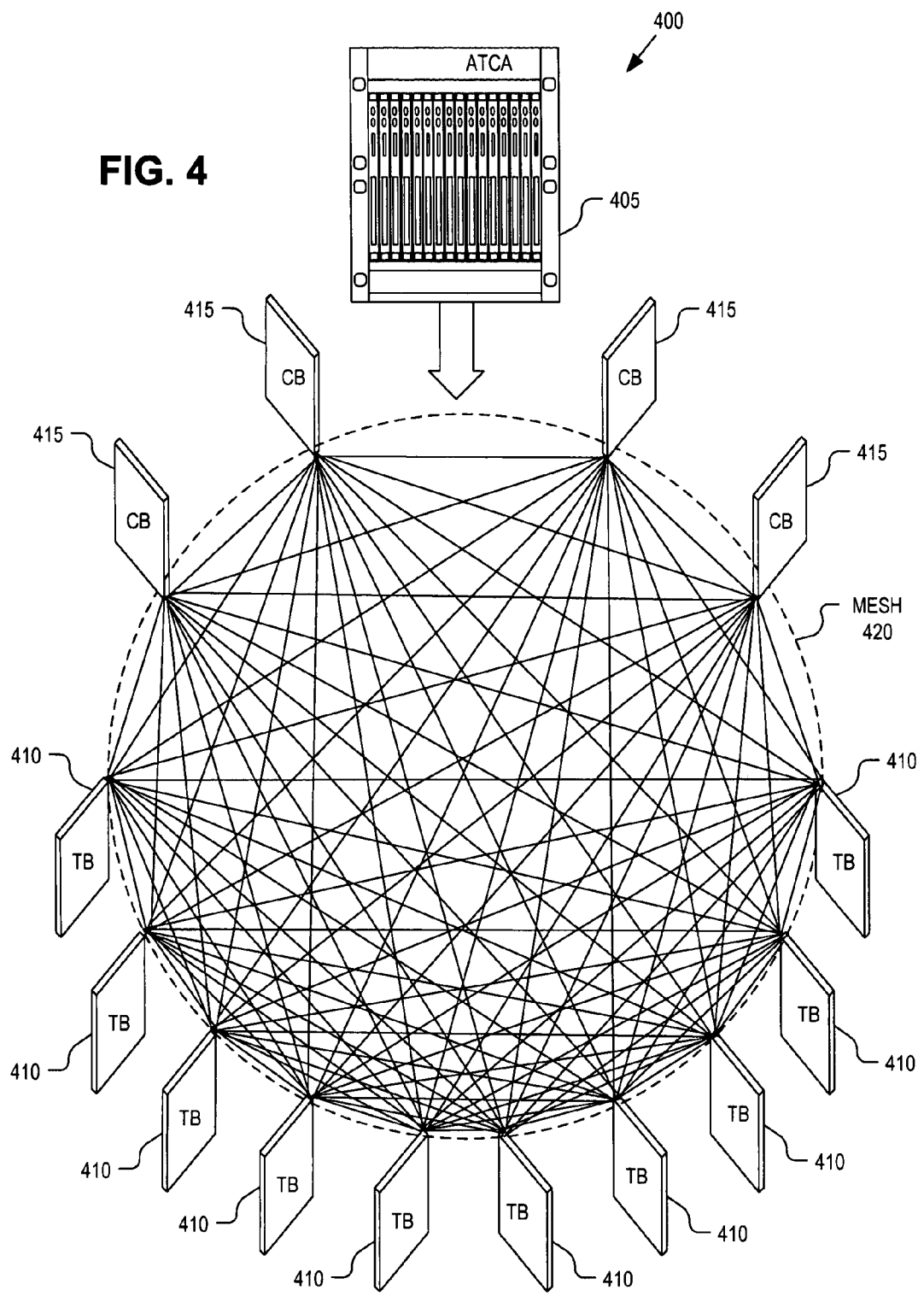
FIG. 4 is a schematic diagram illustrating one configuration of a network service node implemented using an Advanced Telecommunication and Computing Architecture chassis with full-mesh backplane connectivity, in accordance with an embodiment of the invention.

FIG. 4 is a schematic diagram illustrating a network service node 400 implemented using an Advanced Telecommunication and Computing Architecture ("ATCA") chassis with full-mesh backplane connectivity, in accordance with an embodiment of the invention. Network service node 400 is one possible implementation of network service node 305.

In the configuration illustrated in FIG. 4, an ATCA chassis 405 is fully populated with 14 ATCA blades—ten traffic blades ("TBs") 410 and four compute blades ("CBs") 415—each installed in a respective chassis slot. In an actual implementation, chassis 405 may be populated with less blades or may include other types or combinations of TBs 410 and CBs 415. Furthermore, chassis 405 may include slots to accept more or less total blades in other configurations (e.g., horizontal slots). As depicted by interconnection mesh 420, each blade is communicatively coupled with every other blade under the control of fabric switching operations performed by each blade's fabric switch. In one embodiment, mesh interconnect 420 provides a 10 Gbps connection between each pair of blades, with an aggregate bandwidth of 280 Gbps. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

In the illustrated embodiments, network service node 400 is implemented using a distributed architecture, wherein various processor and memory resources are distributed across multiple blades. To scale a system, one simply adds another blade. The system is further enabled to dynamically allocate processor tasks, and to automatically perform failover operations in response to a blade failure or the like. Furthermore, under an ATCA implementation, blades may be hot-swapped without taking the system down, thus supporting dynamic scaling.

Figure 5:
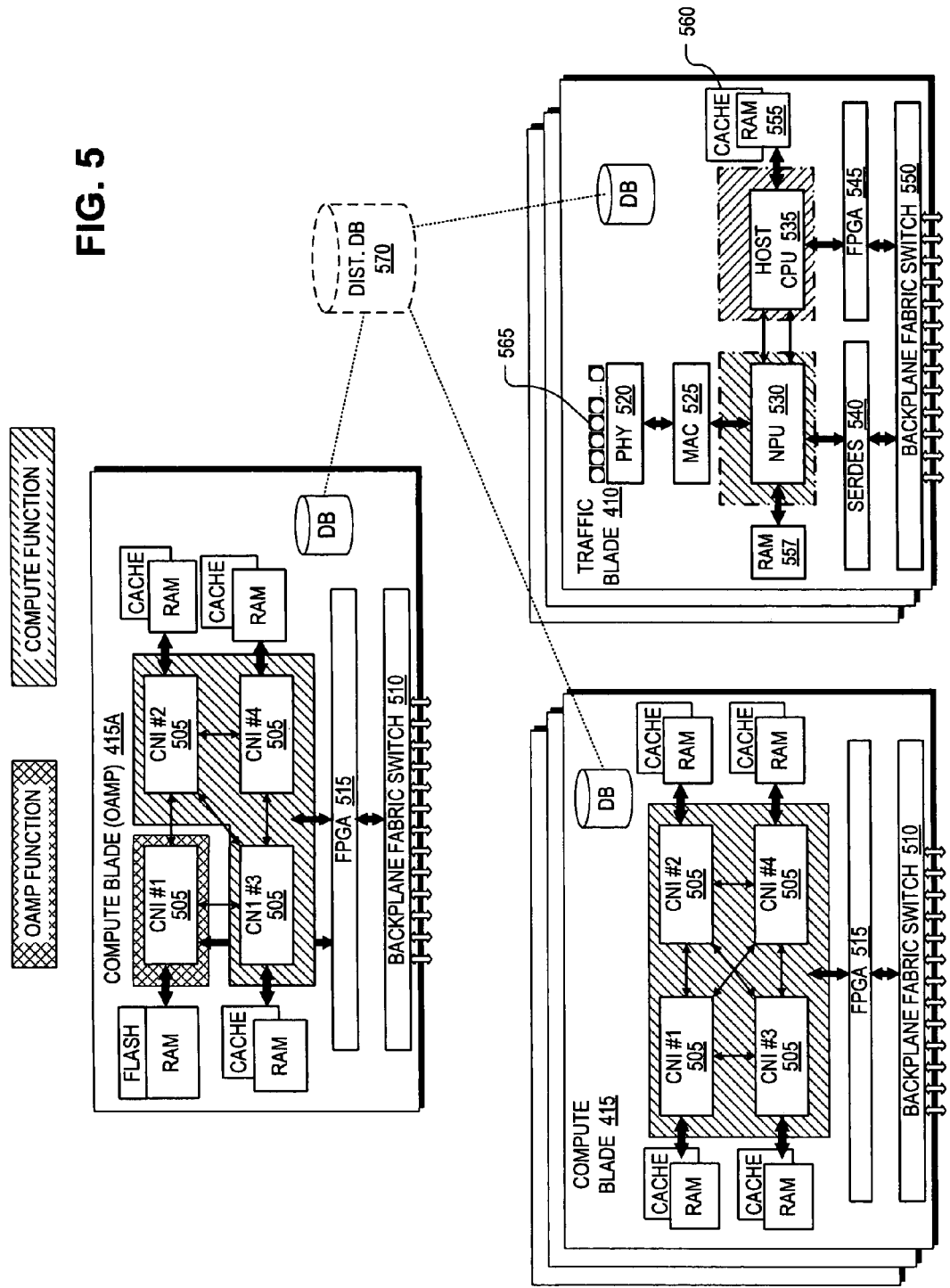
FIG. 5 is a functional block diagram illustrating traffic and compute blade architecture of a network service node for supporting application and subscriber aware packet processing, in accordance with an embodiment of the invention.

FIG. 5 is a functional block diagram illustrating demonstrative hardware architecture of TBs 410 and CBs 415 of network service node 400, in accordance with an embodiment of the invention. The illustrated embodiment of network service node 400 uses a distinct architecture for TBs 410 versus CBs 415, while at least one of CBs 415 (e.g., compute blade 415A) is provisioned to perform operations, administration, maintenance and provisioning ("OAMP") functionality (the OAMP CB).

CBs 415 each employ four compute node instances ("CNIs") 505. CNIs 505 may be implemented using separate processors or processor chips employing multiple processor cores. For example, in the illustrated embodiment of FIG. 5, each of CNI 505 is implemented via an associated symmetric multi-core processor. Each CNI 505 is enabled to communicate with other CNIs via an appropriate interface, such as for example, a "Hyper Transport" (HT) interface. Other native (standard or proprietary) interfaces between CNIs 505 may also be employed.

As further depicted in FIG. 5, each CNI 505 is allocated various memory resources, including respective RAM. Under various implementations, each CNI 505 may also be allocated an external cache, or may provide one or more levels of cache on-chip.

Each CB 415 includes an interface with mesh interconnect 420. In the illustrated embodiment of FIG. 5, this is facilitated by a backplane fabric switch 510, while a field programmable gate array ("FPGA") 515 containing appropriate programmed logic is used as an intermediary component to enable each of CNIs 505 to access backplane fabric switch 510 using native interfaces. In the illustrated embodiment, the interface between each of CNIs 505 and the FPGA 515 comprises a system packet interface ("SPI"). It is noted that these interfaces are mere examples, and that other interfaces may be employed.

In addition to local RAM, the CNI 505 associated with the OAMP function (depicted in FIG. 5 as CNI #1 of CB 415A, hereinafter referred to as the OAMP CNI) is provided with a local non-volatile store (e.g., flash memory). The non-volatile store is used to store persistent data used for the OAMP function, such as provisioning information and logs. In CBs 415 that do not support the OAMP function, each CNI 505 is provided with local RAM and a local cache.

FIG. 5 further illustrates a demonstrative architecture for TBs 410. TBs 410 include a PHY block 520, an Ethernet MAC block 525, a network processor unit (NPU) 530, a host processor 535, a serializer/deserializer ("SERDES") interface 540, an FPGA 545, a backplane fabric switch 550, RAM 555 and 557 and cache 560. TBs 410 further include one or more I/O ports 565, which are operatively coupled to PHY block 520. Depending on the particular use, the number of I/O ports 565 may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

One of the operations performed by TBs 410 is packet identification/classification. A multi-level classification hierarchy scheme is implemented for this purpose. Typically, a first level of classification, such as a 5 or 6 tuple signature classification scheme, is performed by NPU 530. Additional classification operations in the classification hierarchy may be required to fully classify a packet (e.g., identify an application flow type). In general, these higher-level classification operations are performed by CBs 415 via interception or bifurcation of packet flows at TBs 410; however, some higher-level classification may be performed by the TB's host processor 535. Classification rules used to classify packet flows may be distributed about network service node 305 via a distributed database residing on the TBs and the CBs (not illustrated). It should be appreciated that as the number of transistors capable of being integrated on a single semiconductor die continues to increase, some of the functions described herein as "control plane" functions may be migrated to the data plane and executed by NPU 530 or host CPU 535. In fact, it is foreseeable that NPU 530 and/or host CPU 535 may one day be implemented with sufficiently powerful multi-core processors capable of entirely or almost entirely assuming the tasks performed by CNIs 505.

Typically, NPUs are designed for performing particular tasks in a very efficient manner. These tasks include packet forwarding and packet classification, among other tasks related to packet processing. NPU 530 includes various interfaces for communicating with other board components. These include an Ethernet MAC interface, a memory controller (not shown) to access RAM 557, Ethernet and PCI interfaces to communicate with host processor 535, and an XGMII interface. SERDES interface 540 provides the interface between XGMII interface signals and communication protocols of backplane fabric switch 550 to enable NPU 530 to communicate over interconnection mesh 420. NPU 530 may also provide additional interfaces to interface with other components (not shown).

Similarly, host processor 535 includes various interfaces for communicating with other board components. These include the aforementioned Ethernet and PCI interfaces to communicate with NPU 530, a memory controller (on-chip or off-chip—not shown) to access RAM 555, and a pair of SPI interfaces. FPGA 545 is employed as an interface between the SPI interface signals and the HiGig interface signals.

Host processor 535 is employed for various purposes, including lower-level (in the hierarchy) packet classification, gathering and correlation of flow statistics, and application of traffic profiles. Host processor 535 may also be employed for other purposes. In general, host processor 535 will comprise a general-purpose processor or the like, and may include one or more compute cores. In one embodiment, host processor 535 is responsible for initializing and configuring NPU 530.

Figure 6:
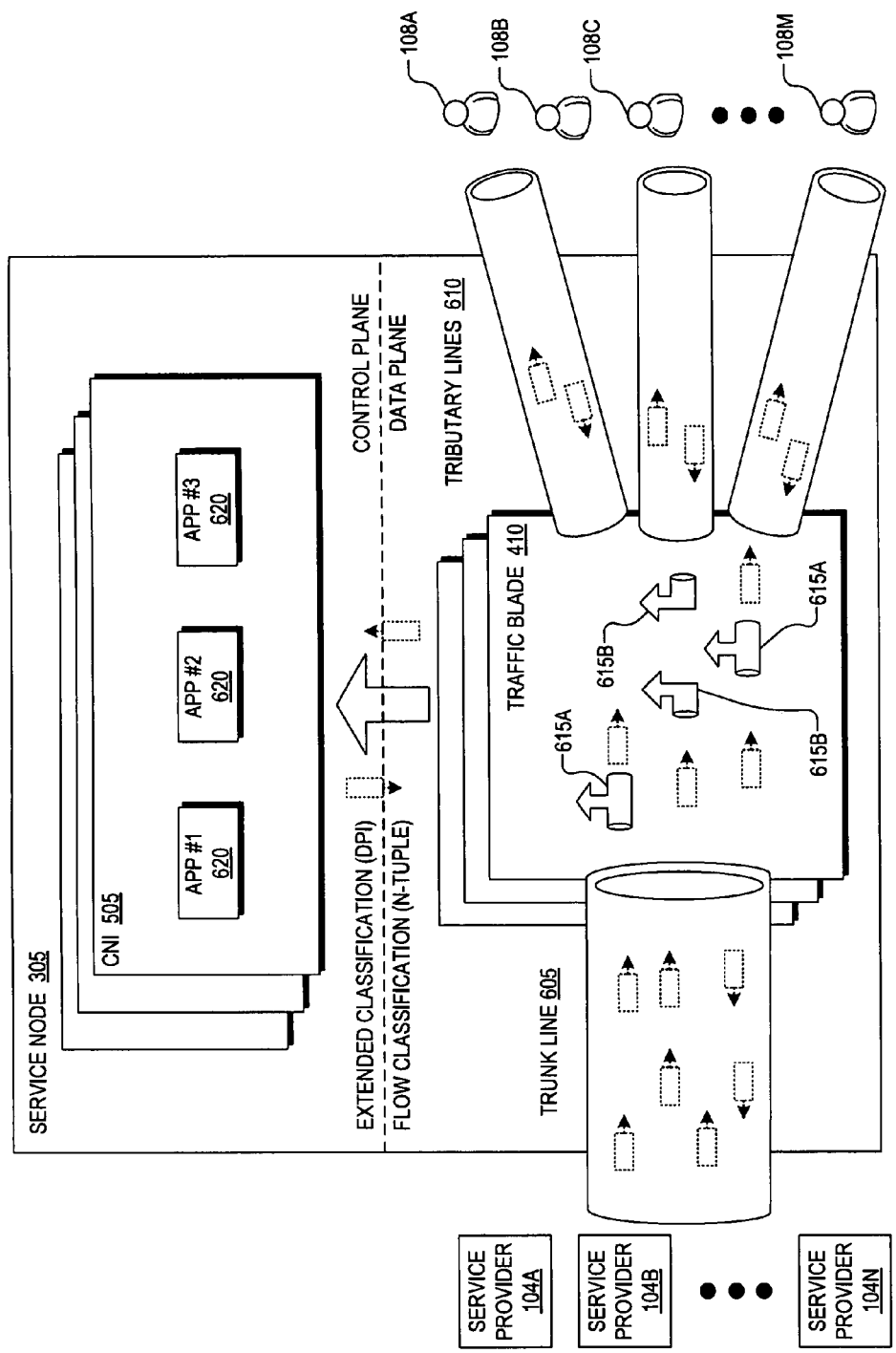
FIG. 6 is a functional block diagram illustrating multi-level packet classification scheme in a distributed compute environment, in accordance with an embodiment of the invention.

FIG. 6 is a functional block diagram illustrating a multi-level packet classification scheme executed within network service node 305, in accordance with an embodiment of the invention. The multi-level classification scheme separates packet flow classification in the data plane, where admission control and packet forwarding is executed, from the packet classification in the control plane, where deep packet inspection (e.g., packet inspection at layers 5 to 7 of the OSI model), application processing (layer 7 processing of application data within a packet flow), control processing, and other supervisory/managerial processing is executed. However, as mentioned above, future advances in processor design may result in an increased migration of stateful classification functions to the data plane.

During operation, packets arrive and depart service node 305 along trunk line 605 from/to service providers 104 and arrive and depart service node 305 along tributary lines 610 from/to subscribers 108. Upon entering TBs 410, access control is performed by comparing Internet protocol ("IP") header fields against an IP access control list ("ACL") to determine whether the packets have permission to enter service node 305. If access is granted, then network service node 305 will proceed to classify each arriving packet.

The first level of classification occurs in the data plane and is referred to as flow classification. Flow classification includes matching upon N fields (or N-tuples) of a packet to determine which classification rule to apply and then executing an action associated with the matched classification rule. TBs 410 perform flow classification in the data plane as a prerequisite to packet forwarding and/or determining whether extended classification is necessary by CBs 415 in the control plane. In one embodiment, flow classification involves 6-tuple classification performed on the TCP/IP packet headers (i.e., source address, destination address, source port, destination port, protocol field, and differentiated service code point).

Based upon the flow classification, TBs 410 may simply forward the traffic, drop the traffic, bifurcate the traffic, intercept the traffic, or otherwise. If a TB 410 determines that a bifurcation classification criteria (bifurcation filter 615A) has been matched, the TB 410 will generate a copy of the packet that is sent to one of CBs 415 for extended classification, and forward the original packet towards its destination. If a TB 410 determines that an interception classification criteria (interception filter 615B) has been matched, the TB 410 will divert the packet to one of CBs 415 for extended classification and application processing prior to forwarding the packet to its destination.

CBs 415 perform extended classification via deep packet inspection ("DPI") to further identify application level classification rules to apply to the received packet flows. Extended classification may include inspecting the bifurcated or intercepted packets at the application level to determine to which application 620 a packet flow should be routed. In one embodiment, applications 620 may perform additional application classification on the packet flows to determine the specific application processing that should be performed on a packet flow. The application classification performed by applications 620 offers a stateful tracking of protocols that may be considered a stateful application awareness mechanism. This stateful application awareness enables applications 620 to apply application specific rules to the traffic, on a per subscriber basis. For example, application #1 may be a VoIP QoE application for monitoring the quality of experience of a VoIP service, application #2 may be a VoD QoE application for monitoring the quality of experience of a VoD service, and application #3 may be an IP filtering application providing uniform resource locator ("URL") filtering to block undesirable traffic, an email filter (e.g., intercepting simple mail transfer protocol traffic), a parental control filter on an IPTV service, or otherwise. It should be appreciated that CBs 415 may execute any number of network applications 620 for implementing a variety of networking functions.

Figure 7:
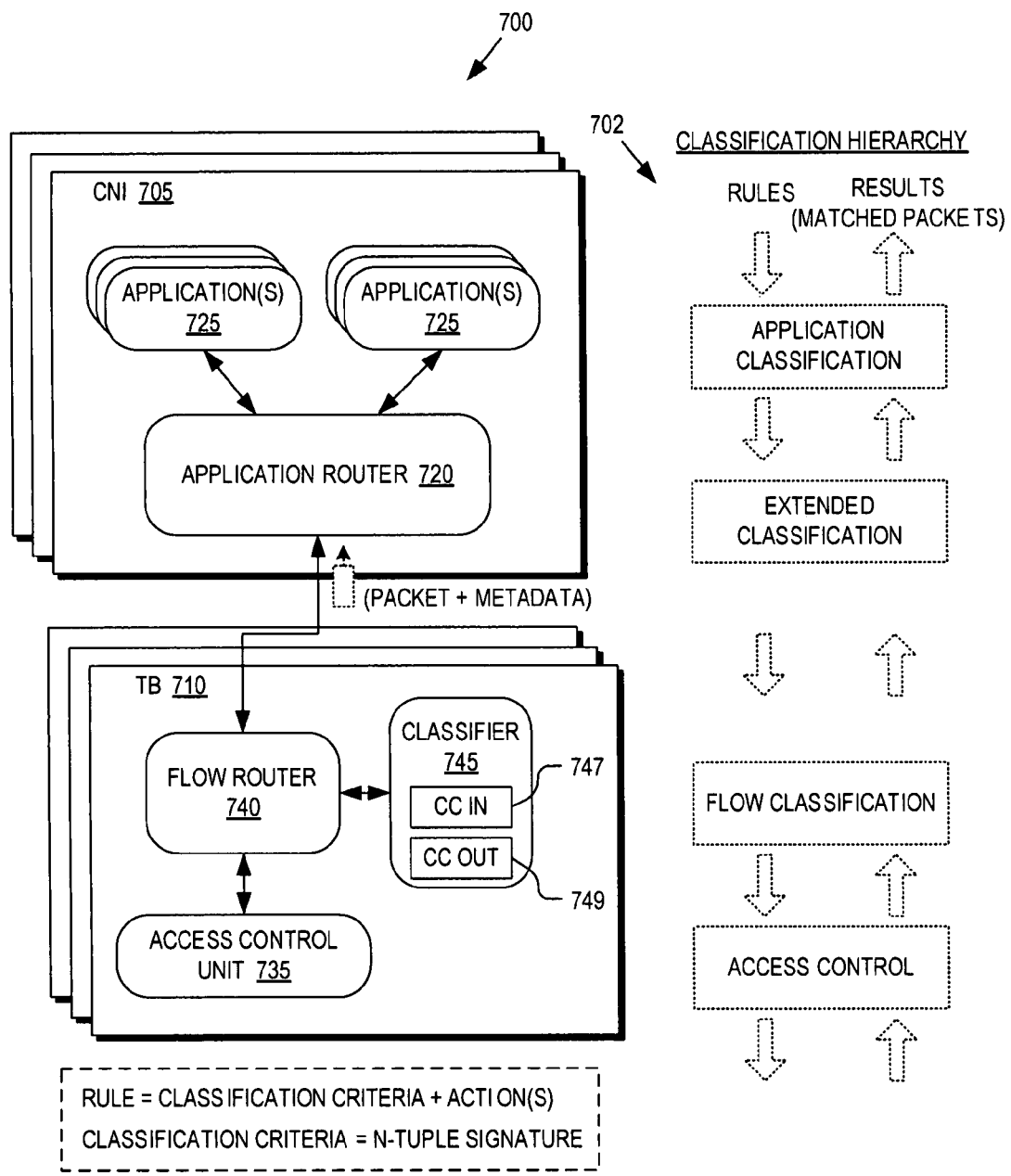
FIG. 7 is a functional block diagram illustrating distributed components for implementing a multi-level classification scheme, in accordance with an embodiment of the invention.

FIG. 7 is a functional block diagram illustrating components of a distributed compute environment 700 for implementing a multi-level classification hierarchy 702, in accordance with an embodiment of the invention. The illustrated of distributed compute environment 700 includes CNIs 705 and TBs 710. CNIs 705 may be implemented by CNIs 505 while TBs 710 may be implemented by TBs 410.

The illustrated embodiment of CNIs 705 each include an application router 720 and network applications 725 executing therein. The illustrated embodiment of TBs 710 each include an access control unit 735, a flow router 740, and a classifier 745 executing therein. FIG. 7 illustrates operational components that reside on each CNI 705 and TB 710. It should be appreciated that network service node 305 includes a plurality of CNIs 705 and therefore many instances of each operational component illustrated executing on CNI 705. Similarly, network service node 305 may include a plurality of TBs 710 and therefore many instances of each operational component illustrated executing on TB 710.

During operation, access control unit 735 executes access control to permit or deny packet flows into network service node 305. Flow router 740 and classifier 745 perform flow classification on permitted packets to classify the permitted packets into flows of related packets (i.e., packet flows). Although classifier 745 and flow router 740 are illustrated as distinct, in one embodiment, classifier 745 is a sub-element of flow router 740.

As discussed above, a classification rule is the combination of a classification criteria (e.g., N-tuple signature) and one or more actions to be executed on a packet flow matching the associated classification criteria. Classifier 745 represents a classification structure that may be implemented in hardware (e.g., ternary content addressable memory ("TCAM")), software (e.g., list, tree, trie, etc.), or some combination thereof. Classifier 745 performs the matching function to determine which classification criteria a particular packet matches, while flow router 740 executes the associated function on the particular packet (e.g., bifurcate, intercept, terminate, forward, etc.).

In one embodiment, classifier 745 operates on a first "hit" policy. In one embodiment, classifier 745 maintains two separate groups or lists of classification criteria-inbound classification criteria 747 and outbound classification criteria 749. Inbound classification criteria 747 is used to match against packets inbound to subscribers 108, while outbound classification criteria 749 is used to match against packets outbound from subscribers 108. Maintaining inbound and outbound classification criteria independent of each other simplifies the flow classification process and avoids rule masking in the scenario where two subscribers 108 are communicating with each other and all subscriber traffic is arriving or departing along tributary lines 610.

When flow router 740 determines that a particular packet is to be routed to the control plane for extended classification (e.g., intercepted or bifurcated), flow router 740 will provide the packet to an appropriate one of application routers 720 along with classification metadata. The classification metadata may include an indication of the N-tuple match determined by classifier 745 so that application router 720 need not re-execute the N-tuple matching function.

In one embodiment, flow routers 740 executing on the individual TBs 710 perform a subscriber based classification scheme. In other words, all subscriber traffic associated with the same subscriber (whether inbound or outbound) is routed to the same application router 720 executing on the same CNI 705. A subscriber based routing scheme enables application routers 720 and/or network applications 725 to retain stateful information regarding a particular subscriber while a given session is pending or even across multiple sessions.

Application router 720 performs extended classification over and above the flow classification performed by flow router 740 to determine to which of network applications 725 a packet that has been elevated to the control plane should be routed. Extended classification may include DPI to inspect packet data at layers 5 through 7 of the OSI model. In other words, application router 720 may not merely inspect header data, but also payload data. The payload data may carry various signatures of application protocols or application data upon which extended classification criteria is matched against. For example, application router 720 may DPI search for session initiation protocol ("SIP") packets identifiable with various applications running on subscribers 108. The elevated packets may then be routed to the appropriate network application 725 for processing.

Application router 720 performs application routing to provide packets to the appropriate network applications 725. In some cases, multiple network applications 725 need to inspect the same packet. Accordingly, routing packets within a single CNI 705 need not provide redundant copies of the packet to each network application 725 (although redundant copies may be provided if advantageous). Rather, application router 720 may simply store a packet in a memory location and provide pointers to the memory location to multiple network applications 725.

Finally, network applications 725 may perform application classification on packets promoted to network applications 725. Application classification may be performed to determine the specific action or function to perform on the packet. In some embodiments, network applications 725 are distributed applications having an instance executing on each CNI 705, as well as, a managerial instance executing on OAMP CNI (not illustrated). Network applications 725 can manipulate packets, manipulate how packets are treated, simply monitor packets, or otherwise.

Figure 8:
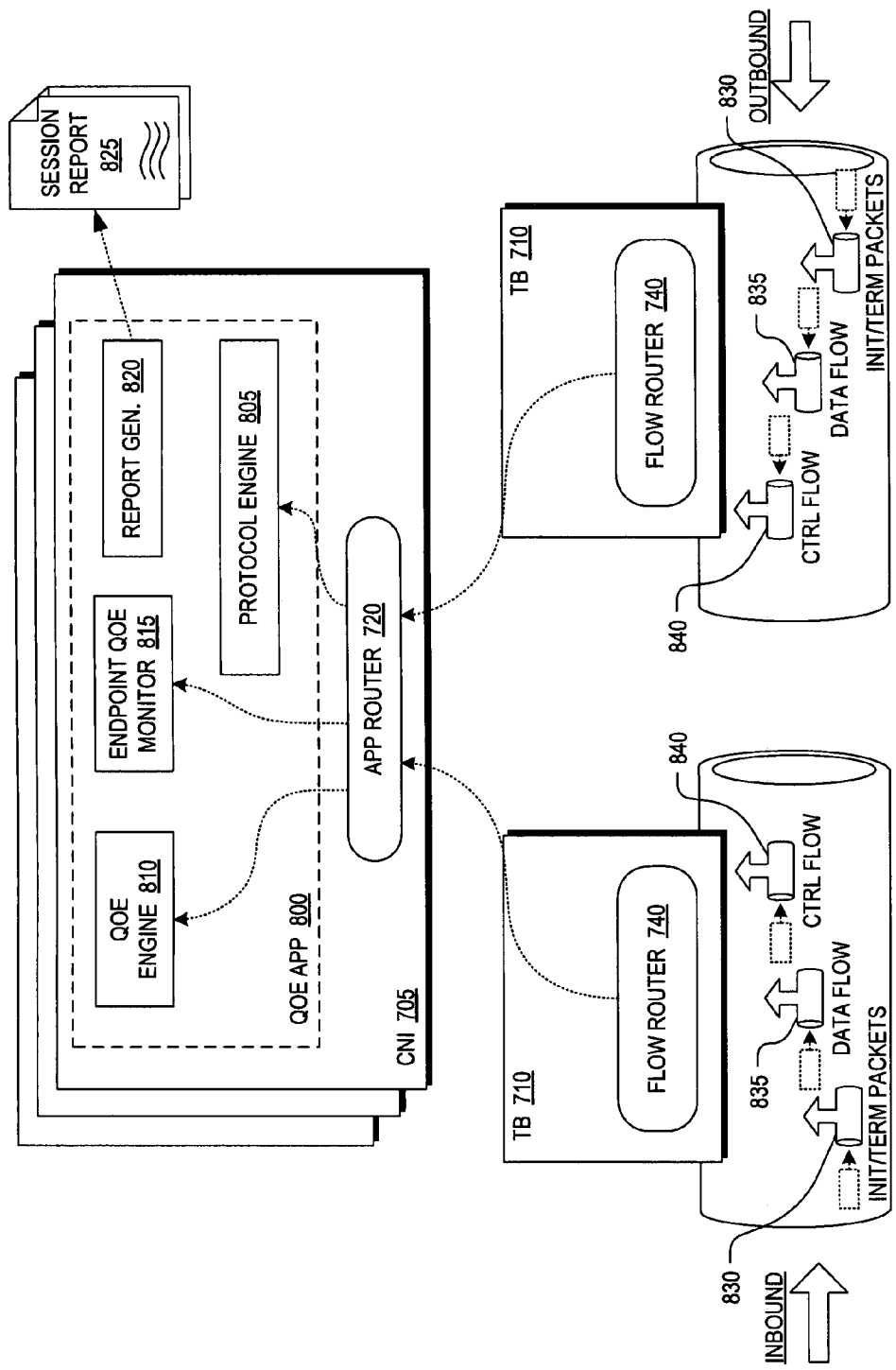
FIG. 8 is a functional block diagram illustrating components of a quality of experience application executing on a compute node instance of a service node, in accordance with an embodiment of the invention.

FIG. 8 is a functional block diagram illustrating components of a quality of experience ("QoE") application 800 executing on a CNI 705 of service node 305, in accordance with an embodiment of the invention. QoE application 800 is one possible implementation of applications 620 or 725. The illustrated embodiment of QoE application 800 includes a protocol engine 805, a QoE engine 810, an endpoint QoE monitor 815, and a report generator 820 for generating session reports 825.

Multiple instances of QoE application 800 may be simultaneously executed on a plurality of CNIs 705 within service node 305. Each instance of QoE application 800 is responsible for monitoring QoE on a per subscriber, per session basis for the subscribers 108 assigned to the particular CNI 705. Furthermore, each CNI 705 may execute a variety of QoE applications 800 for monitoring a variety of network services. For example, CNI 705 may execute a VoIP QoE application for monitoring VoIP calls, may execute a VoD QoE application for monitoring VoD downloads, may execute an IPTV QoE application for monitoring IPTV service, or otherwise. In an alternative embodiment, QoE application 800 may be capable of monitoring various different network services and the knowledge necessary to identify and interpret the individual protocols or services is incorporated into protocol engine 805.

QoE application 800 executes in the control plane of service node 305 and receives replicated copies of control packet flows and data packet flows from the data plane. The control packet flows may carry various control protocol information (e.g., real-time control protocol ("RTCP") or the like) for delivering an associated data packet flow (e.g., real-time protocol ("RTP") or the like). Protocol engine 805 is capable of identifying and interpreting the initiation, termination, and other signaling packets transmitted by various control flow protocols. When protocol engine 805 identifies the commencement of a new communication session (e.g., new VoIP call, new VoD request, new IPTV channel request, etc.), protocol engine 805 notifies QoE engine 810 and endpoint QoE monitor 815 to that effect. For example, protocol engine 805 may include a session initial protocol ("SIP") engine component that is capable of identifying SIP invite packets, SIP ACK packets, or the like. Similarly, protocol engine 805 is capable of identifying session termination packets and notifies QoE engine 810, endpoint QoE monitor 815, and report generator 820 to that effect. By tracking the control packets, protocol engine 805 can identify what the pending constituent protocols will be. This stateful tracking of control packets enables protocol engine 805 can inform application router 720 of the pending constituent control flows that should be tracked (e.g., intercepted, bifurcated, etc.). In turn, application router 720 can install classification rules into flow routers 740 to catch these pending constitutes control flows.

In one embodiment, protocol engine 805 instantiates a new instance of QoE engine 810 and endpoint monitor 815 for each communication session identified. Subsequently, upon termination of the communication session the corresponding instances of QoE engine 810 and endpoint QoE monitor 815 are also terminated. In one embodiment, QoE engine 810 and endpoint QoE monitor 815 are instantiated on a per subscriber basis. In yet another embodiment, single instances of QoE engine 810 and endpoint QoE monitor 815 monitor all application relevant traffic routed to CNI 705 by flow routers 740 and application router 720 for the subscribers 108 assigned to the particular CNI 705.

Protocol engine 805 may also be capable of identifying various other control signal packets of significance, as well. In the case of VoIP, protocol engine 805 may be used to identify and interpret RTCP Extended Reports ("XR") packets. RTCP XR is a management protocol that defines a set of metrics that contain information for assessing VoIP call quality and diagnosing problems. RTCP XR messages are exchanged periodically between IP phones and may including information such as, packet loss rate, packet discard rate, distribution of lost and discarded packets, round-trip delay, end system delay (represents the delay that the VoIP endpoint adds), signal level, noise level, residual (uncanceled) echo level, jitter buffer size, and type of packet-loss concealment algorithm used.

RTCP XR may also be used to deliver an endpoint quality of content rating generated by one endpoint to a communication session (e.g., the endpoint IP phones) to the other endpoint and vice versa. In one embodiment, this endpoint quality of content rating may be a mean opinion score ("MOS"). In multimedia communications (e.g., audio, voice telephony, or video), the MOS provides a numerical indication of the perceived quality of received content at the endpoints. The MOS is particularly useful when codecs or compression/decompression algorithms are used to delivery the content. The MOS may be expressed as a single number in the range 1 to 5, where 1 is lowest perceived quality, and 5 is highest perceived quality. The MOS is generated by averaging the results of a set of standard, subjective tests where a number of listeners rate the heard audio quality of test sentences read aloud by both male and female speakers over a communication medium being tested. Various algorithms have been created to automatically generate the MOS in real-time. In one embodiment, this endpoint quality of content rating may be a subjective video quality score, which is similar to the MOS but tailored for measuring subjective video quality.

In one embodiment, once protocol engine 805 has identified a new communications session (audio, voice telephony, video, etc.), endpoint QoE monitor 815 may commence monitoring the control packet flow to identify, record, and track the endpoint quality of content ratings being exchanged between the endpoints. Similarly, once a new communication session is identified, QoE engine 810 may commence generation of an intermediate point quality of content rating. QoE engine 810 may execute this function by receiving copies of the data packet flows flowing in both directions and calculate its own quality of content rating (e.g., MOS) at the intermediate point between the endpoints where service node 305 resides. This intermediate point quality of content rating rates the quality of the content received at service node 305 before the content is delivered to its endpoint destination.

Figure 9:
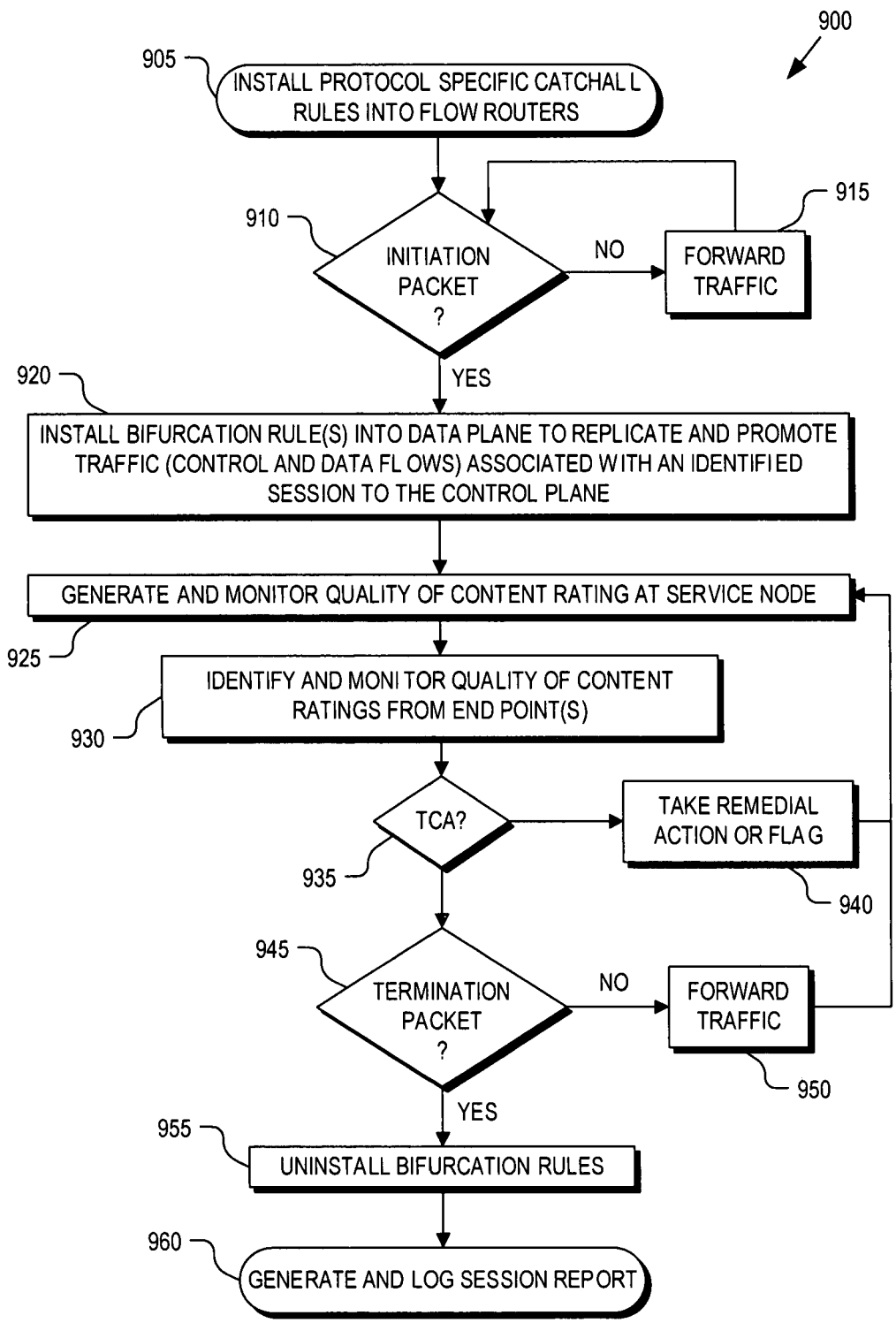
FIG. 9 is a flow chart illustrating a process for monitoring and reporting quality of experience on a per subscriber, per session basis, in accordance with an embodiment of the invention.

FIG. 9 is a flow chart illustrating a process 900 for monitoring and reporting QoE on a per subscriber, per session basis, in accordance with an embodiment of the invention. Process 900 is described with reference to FIG. 8. It should be appreciated that the order in which some or all of the process blocks appear in each process should not be deemed limiting. Rather, one of ordinary skill in the art having the benefit of the present disclosure will understand that some of the process blocks may be executed in a variety of orders not illustrated including in parallel.

In a process block 905, catchall rules 830 are installed into the data plane to identify session initiation (e.g., SIP request) or session termination packets within control packet flows. Catchall rules 830 filter control packet flows flowing through TBs 710 to identify the initiation of a new communication session (e.g., telephony call) or the termination of an existing communication session. Catchall rules 830 are the mechanism by which protocol engine 805 identifies the initiation and termination of sessions. Catchall rules 830 may be bifurcation rules that are installed by protocol engine 805 into flow routers 740 of service node 305. In one embodiment, the classification criteria for the catchall rules are installed directly into classifiers 745 (e.g., TCAMs) while the bifurcation action associated with the catchall rule is installed into flow routers 740.

When one of catchall rules 830 identifies an initiation packet (e.g., SIP request) (decision block 910), flow router 740 bifurcates the control packet flow associated with the initiation packet. The original control packet flow is forwarded onto its destination by TB 710, while a replicated copy is promoted to the control plane by flow router 740, and in particular, is promoted to an application router 720 associated with the subscriber 108 to which the control packet flow is associated. The associated application router 720 then provides the replicated copy of the control packet flow to QoE application 800, and in particularly to protocol engine 805. If no session initiation/session termination packet is received at TBs 710, then TBs 710 continue to forward traffic as usual (process block 915).

Once a new control packet flow is delivered to protocol engine 805, it can interpret the control data contained therein to identify a new communication session associated with a particular subscriber 108. In response, protocol engine 805 may install temporary bifurcation rules (e.g., data flow bifurcation rules 835 and control flow bifurcation rules 840) into flow routers 740 (process block 920). Protocol engine 805 can extract all the necessary information from the initiation packet to generate the temporary bifurcation rules (e.g., 5-tuple signature to identify associated data flow and control flow). The temporary bifurcation rules are installed in TBs 710 facing both endpoints of the inbound and outbound flows so as to catch and bifurcate both traffic inbound to the particular subscriber 108 and outbound from the subscriber 108. The temporary bifurcation rules are installed to catch control and data flow packets related to a particular session identified by protocol engine 805 based on the initiation packet identified in decision block 910.

In addition to installing temporary bifurcation rules, protocol engine 805 notifies QoE engine 810 and endpoint QoE monitor 815 of the new communication session. In process block 925, QoE engine 810 commences generation of intermediate point quality of content ratings (process block 925). QoE engine 810 receives replicated copies of the inbound and outbound data packet flows via bifurcation rules 835 installed into the inbound and outbound TBs 710. QoE engine 810 analyzes the inbound and outbound content received at service node 305 to calculate intermediate point quality of content ratings based on the payload content carried by the inbound and outbound data packet flows. The intermediate point quality of content ratings may be calculated in real-time as the data packet flows are forwarded through the data plane of service node 305. In the case of a VoIP telephony call, QoE engine 810 may generate an inbound MOS for rating the quality of the inbound voice stream and an outbound MOS for rating the quality of the outbound voice stream.

In a process block 930, endpoint QoE monitor 815 commences monitoring and tracking the endpoint quality of content ratings generated by the endpoints to the communication session (process block 930). Endpoint QoE monitor 815 receives replicated copies of the inbound and outbound data control flows via bifurcation rules 840 installed into the inbound and outbound TBs 710. Endpoint QoE engine 815 analyzes the inbound and outbound control protocols received at service node 305 to extract the endpoint quality of content ratings periodically exchanged between the endpoints to the communication session and delivered in the control packet flows. These endpoint quality of content ratings may be extracted and tracked in real-time as the control packet flows are forwarded through the data plane of service node 305. In the case of a VoIP telephony call, endpoint QoE engine 815 may identify and extract MOS's generated by each endpoint to the VoIP telephony call.

A variety of quality of service threshold crossing alerts ("TCA's") may be internally set by QoE application 800. A TCA is an alert issued at a point in time when a metric crosses a defined threshold. These TCA's may correspond to minimum acceptable levels for the intermediate point quality of content ratings calculated by QoE engine 810 or endpoint quality of content ratings monitored by endpoint QoE monitor 815. Of course, thresholds for issuing TCAs may be set for more than only tracking intermediate and end point quality of content ratings. If a TCA is triggered (decision block 935), QoE application 800 may take remedial action or flag the TCA for a network administrator and log the TCA in a report (process block 940). The remedial action may be taken automatically in real-time or at the behest of the network administrator. For example, remedial actions may include selectively dropping traffic flowing through service node 305, temporarily adjusting (e.g., increasing) a bandwidth allocation associated with one of the endpoints to the communication session, diverting the data packet flows to an internal queue with a higher QoS rating, issuing an alert to the network administrating, or otherwise.

When a session termination packet is received and identified by protocol engine 805 corresponding to the current communication session (decision block 945), process 900 continues to a process block 955. Otherwise, QoE application 800 continues to forward the subscriber traffic towards its destination (process block 950). In process block 955, protocol engine 805 uninstalls data flow bifurcation rules 835 and control flow bifurcation rules 840 corresponding to the recently terminated communication session. Uninstalling bifurcation rules of terminated communication rules releases resources in classifier 745 for recycle (e.g., TCAM entries).

Finally, in a process block 960, protocol engine 805 notifies QoE engine 810, endpoint QoE monitor 815, and report generator 820 that the communication session has terminated. In response, QoE engine 810 and endpoint QoE monitor 815 provide their accumulated data to report generator 820, which gathers and formats the information into session report 825. In one embodiment, report generator 820 generates an independent session report 825 at the termination of each independent communication session flowing through service node 305.

Session report 825 may detail a variety of attributes about the data packet flow and the terminated communication session supported thereby. FIG. 10 is an example session report 1000 for a VoIP call, in accordance with an embodiment of the invention. Session report 1000 may also be referred to as a call report. The illustrated embodiment of session report 1000 includes a subscriber ID, a session ID, a protocol ID, a call duration, a call start time, a call termination time, a source phone number, a destination phone number, an average, low, and high MOS for the source caller and the destination callee, and an average, low, and high intermediate point MOS calculated by QoE engine 810 for the inbound and outbound voice streams. It should be appreciated that session report 1000 is merely an example and other session reports may include only a subset of the information illustrated in FIG. 10 or include additional information not illustrated in FIG. 10.

Figure 11:
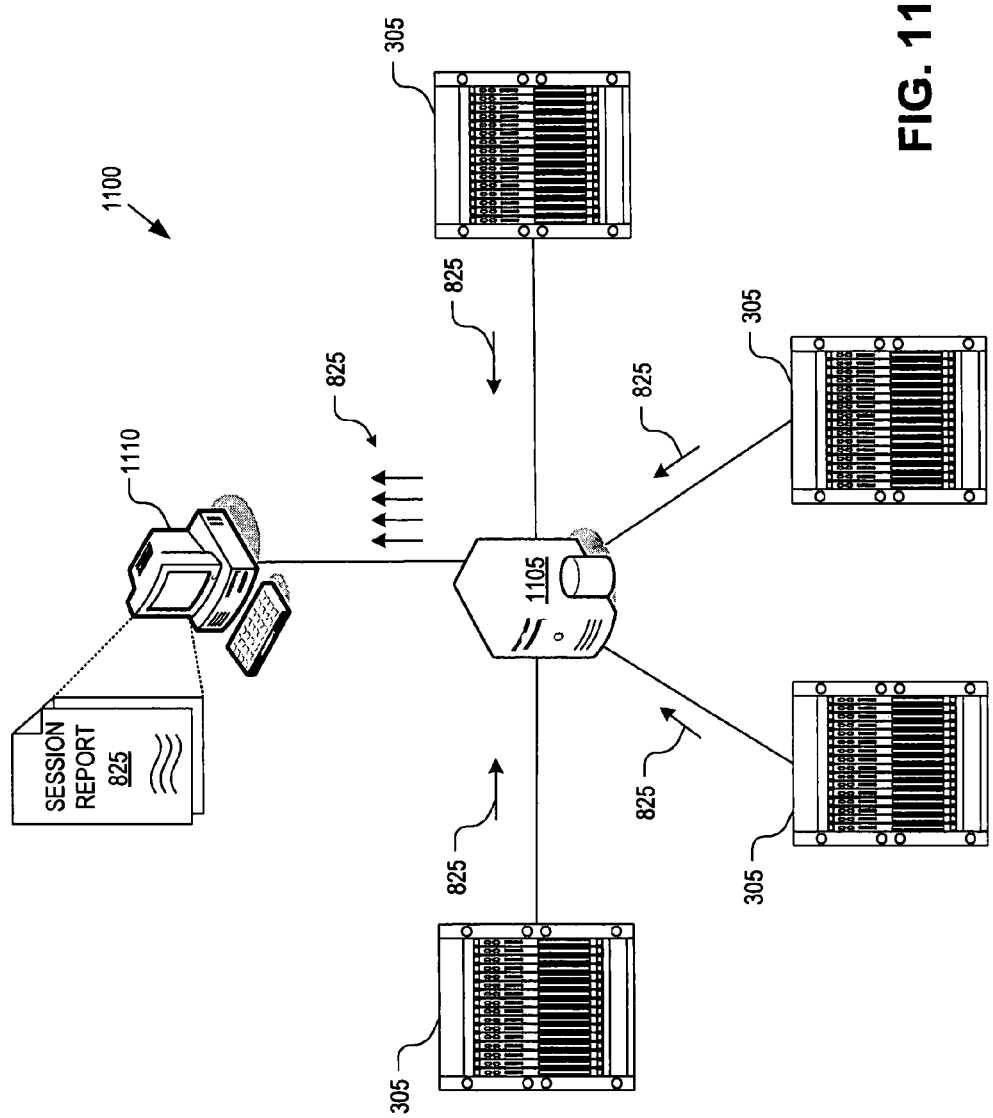
FIG. 11 illustrates a system of service nodes for transmitting session reports to an external management server, in accordance with an embodiment of the invention.

FIG. 11 illustrates a system 1100 of service nodes 350 for transmitting session reports 825 to an external management server ("EMS") 1105, in accordance with an embodiment of the invention. EMS 1105 may receive session reports 825 periodically in bulk from service nodes 305 or in real-time at the termination of each communication session. EMS 1105 may then make session reports 825 available to one or more remote terminals 1110 for access by a variety of interested parties including a network administrator, a service provider, customer representatives working for one or more service providers, or even made at least partially available to subscribers 108 as an online detailed billing statement/record.

Session reports 825 may be used to arbitrate disputes between service providers 104 and subscribers 108 by tracking the QoE on a per subscriber, per session basis. Every communication session can be tracked and logged for future reference. The information or session attributes stored in each session report 825 may be used to confirm whether contracted QoE has been delivered to the subscriber or confirm substandard service. Furthermore, the combination of the endpoint quality of content ratings along with the intermediate point quality of ratings can be used to identify failure points or sources of inference in core networks 102, access networks 106, or on the subscriber premises. For example, the intermediate point quality of content ratings (e.g., MOS calculated at service nodes 305) can be used to confirm whether the inbound content (e.g., inbound voice stream) received at service node 305 meets expected QoE standards and whether the outbound content received at service node 305 (e.g., outbound voice stream) also meets expected QoE standards by monitoring the QoE in real-time.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
  forwarding a data packet flow carrying content between first and second endpoints, wherein the data packet flow is forwarded at an intermediate point between the first and second endpoints, wherein the first and second endpoints are communicatively coupled over one or more networks through the intermediate point;
  forwarding a control packet flow between the first and second endpoints, wherein the control packet flow is forwarded at the intermediate point and carries control protocol information related to the data packet flow;
  analyzing the data packet flow at the intermediate point;
  generating an intermediate point quality of content rating of the content received at the intermediate point prior to delivery of the content to one of the first or second endpoints;
  inspecting the control packet flow at the intermediate point to identify an endpoint quality of content rating generated by one of the first or second endpoints and sent to the other one of the first or second endpoints, wherein the endpoint quality of content rating is rating the content received at the one of the first or second endpoints; and
  generating a report, at the intermediate point, detailing one or more attributes about the data packet flow based at least in part on the intermediate point quality of content rating and based at least in part on the endpoint quality of content rating.

2. The method of claim 1, wherein generating the report further comprises generating the report on a per communication session basis.

3. The method of claim 1, further comprising:
  monitoring a data plane of a service node located at the intermediate point carrying the control packet flow;
  identifying an initiation packet within the control packet flow indicating commencement of a communication session between the first and second end points; and
  installing at least one classification rule into the data plane to identify the data and control packet flows associated with the communication session.

4. The method of claim 3, further comprising
  identifying a termination packet within the control packet flow indicating termination of the communication session; and
  uninstalling the classification rule from the data plane.

5. The method of claim 3, wherein the classification rule comprises a bifurcation rule, the method further comprising:
  replicating the data and control packet flows to generate replicated data and control packet flows in response to the bifurcation rule identifying a match on the data and control packet flows; and
  promoting the replicated data and control packet flows to a control plane of the service node, wherein the intermediate point quality of content rating and the report are generated by applications executing in the control plane.

6. The method of claim 1, wherein the data packet flow comprises a real-time protocol ("RTP") flow and the control packet flow comprises a real-time control protocol ("RTCP") flow.

7. The method of claim 6, wherein the first and second endpoints comprise first and second subscribers to a voice over internet protocol ("VOIP") service and wherein the report comprises a call report.

8. The method of claim 1, wherein the content comprises at least one of voice over internet protocol ("VOIP") content, video on demand ("VOD") content, streaming audio content, or streaming video content.

9. The method of claim 1, wherein the intermediate point quality of content rating comprises a mean opinion score.

10. The method of claim 1 further comprising:
monitoring at least one of the intermediate and endpoint quality of content ratings at a service node located at the intermediate point;
determining whether the at least one of the intermediate and endpoint quality of content ratings cross a threshold value; and
issuing a threshold crossing alert ("TCA") in real-time in response to crossing the threshold value.

11. The method of claim 10, further comprising executing a remedial action in real-time at the service node in response to the TCA.

12. The method of claim 11, wherein the remedial action includes at least one of selectively dropping traffic flowing through the service node, adjusting a bandwidth allocation associated with one of the endpoints, issuing an alert to a network administrator, or flagging the TCA in a log report.

13. Machine-accessible media that provides instructions that, when executed by a machine, will cause the machine to perform operations comprising:
forwarding a data packet flow carrying content between first and second endpoints, wherein the data packet flow is forwarded at an intermediate point between the first and second endpoints, wherein the first and second endpoints are communicatively coupled over one or more networks through the intermediate point;
forwarding a control packet flow between the first and second endpoints, wherein the control packet flow is forwarded at the intermediate point and carries control protocol information related to the data packet flow;
analyzing the data packet flow at the intermediate point;
generating an intermediate point quality of content rating of the content received at the intermediate point prior to delivery of the content to one of the first or second endpoints;
inspecting the control packet flow at the intermediate point to identify an endpoint quality of content rating generated by one of the first or second endpoints and sent to the other one of the first or second endpoints, wherein the endpoint quality of content rating is rating the content received at the one of the first or second endpoints; and
generating a report, at the intermediate point, detailing one or more attributes about the data packet flow based at least in part on the intermediate point quality of content rating and based at least in part on the endpoint quality of content rating.

14. The machine-accessible media of claim 13, wherein generating the report further comprises generating the report on a per communication session basis.

15. The machine-accessible media of claim 13, further providing instructions that, when executed by the machine, will cause the machine to perform further operations, comprising:
monitoring a data plane of a service node located at the intermediate point carrying the control packet flow;
identifying an initiation packet within the control packet flow indicating commencement of a communication session between the first and second end points; and
installing a classification rule into the data plane to identify the data and control packet flows associated with the communication session.

16. The machine-accessible media of claim 15, wherein the classification rule comprises a bifurcation rule, the machine-accessible media further providing instructions that, when executed by the machine, will cause the machine to perform further operations, comprising:
replicating the data and control packet flows to generate replicated data and control packet flows in response to the bifurcation rule identifying a match on the data and control packet flows; and
promoting the replicated data and control packet flows to a control plane of the service node, wherein the intermediate point quality of content rating and the report are generated by applications executing in the control plane.

17. The machine-accessible media of claim 13, wherein the data packet flow comprises a real-time protocol ("RTP") flow and the control packet flow comprises a real-time control protocol ("RTCP") flow.

18. The machine-accessible media of claim 13, further providing instructions that, when executed by the machine, will cause the machine to perform further operations, comprising:
monitoring at least one of the intermediate and endpoint quality of content ratings at a service node located at the intermediate point;
determining whether the at least one of the intermediate and endpoint quality of content ratings cross a threshold value; and
issuing a threshold crossing alert ("TCA") in real-time in response to crossing the threshold value.

19. The machine-accessible media of claim 18, further comprising executing a remedial action in real-time at the service node in response to the TCA.

20. A network device for coupling at an intermediate point between a plurality of subscribers of network services and providers of the network services, the network device comprising a plurality of processors and computer readable media, the computer readable media containing a distributed data structure for execution by the plurality of processors, the distributed data structure comprising:
a flow router to forward packet flows through the network device to their destinations and to route replicates of a portion of the packet flows identified as being related to a communication protocol to compute node instances of the network device, wherein the flow router routes the replicates on a per subscriber basis by routing the replicates associated with a given subscriber to a same one of the compute node instances;
a protocol engine for recognizing initiation packets of the communication protocol and to install filters into the flow router to identify the packet flows related to the communication protocol;
a quality of experience ("QOE") engine to calculate a intermediate point quality of content rating of content flowing through the network device; and a report generator to generate a report detailing one or more attributes about the packet flows based at least in part on the quality of content rating.

21. The network device of claim 20, wherein the distributed data structure further comprises:

an endpoint QOE monitor to inspect a control packet flow related to the communication protocol and to identify an endpoint quality of content rating included within the control packet flow that was generated by one of the subscribers to rate the content received by the one of the subscribers, wherein the report generator is further to generate the report based at least in part on the endpoint quality of content rating identified in the control packet flow.

22. The network device of claim 21, wherein the intermediate point quality of content rating comprises a first mean opinion score ("MOS") calculated by the QOE engine in real-time and the endpoint quality of content rating comprises a second MOS calculated by the one of the subscribers.

23. The network device of claim 20, wherein the filters comprise control flow filters and data flow filters, and wherein the protocol engine is further configured to install the control and data flow filters in response to identifying commencement of a communication session using the communication protocol to identify control packet flows and data packet flows, respectively, corresponding to the communication session.

24. The network device of claim 23, wherein the report generator generates a session report detailing one or more attributes about the communication session.

25. The network device of claim 23, wherein the data flow comprises a real-time protocol ("RTP") flow and the control flow comprises a real-time control protocol ("RTCP") flow.

26. The network device of claim 20, wherein the distributed data structure further comprises:

an application router to direct the packet flows promoted to the compute node instance to a QoE application.

27. The network device of claim 20, wherein the protocol engine instantiates a new instance of the QOE engine for each communication session tracked by the system on a per subscriber, per session basis.

* * * * *